March 24, 1925. 1,530,865
F. VOGEL
COLLAPSIBLE RIM
Filed June 22, 1921
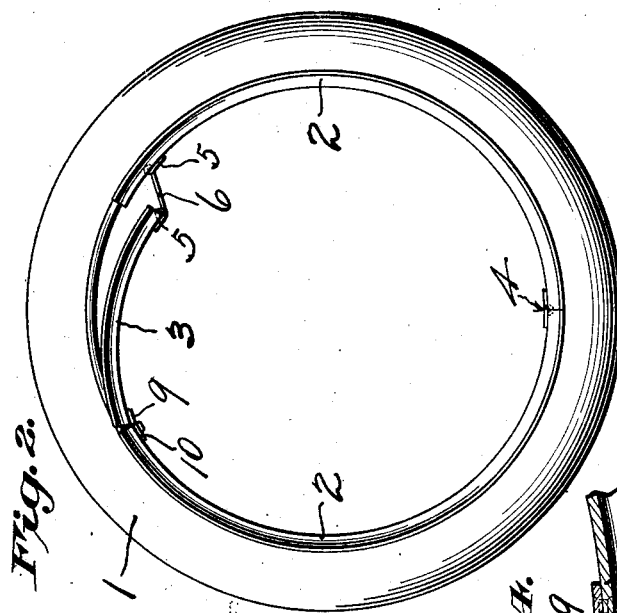
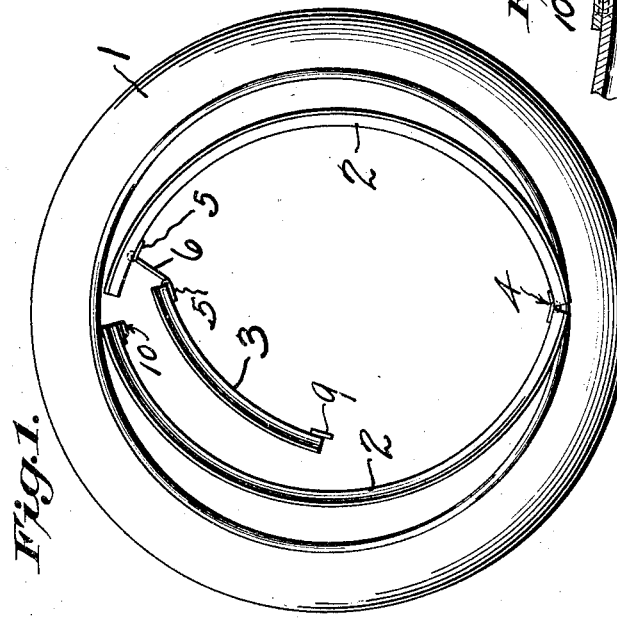
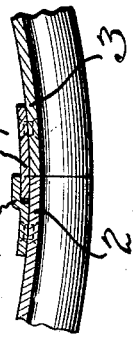
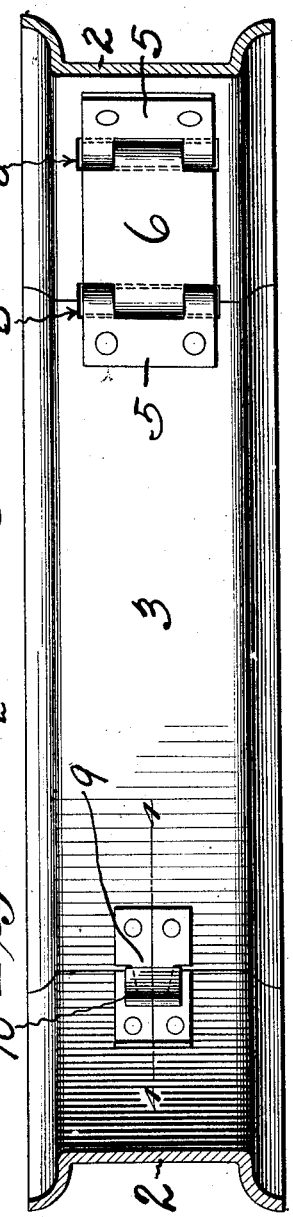
WITNESSES:—
Inventor
F. Vogel,
By
Attorney Patented Mar. 24, 1925.

1,530,865

UNITED STATES PATENT OFFICE.

FREDERICK VOGEL, OF WYETH, OREGON.

COLLAPSIBLE RIM.

Application filed June 22, 1921. Serial No. 479,674.

*To all whom it may concern:*

Be it known that I, FREDERICK VOGEL, citizen of the United States, residing at Wyeth, in the county of Hood River and State of Oregon, have invented certain new and useful Improvements in Collapsible Rims, of which the following is a specification.

This invention relates to collapsible rims of the type usually employed in mounting pneumatic tires on the wheels of motor vehicles.

To that end the invention has particularly in view a rim which is transversely divided at intervals to provide rim sections capable of being readily removed from their normally operative position to effect an expeditious collapsing of the rim.

One of the objects is to simplify the construction and reduce the number of rim sections to a practical degree whereby the strength and durability of an integral or unitary rim is preserved and embodied in a rim of the collapsible type. In this connection the invention also contemplates a construction which may be readily carried into effect upon standard rims now in use, as well as embodied in the originally new rims especially constructed for the purpose.

Further, the invention resides in the provision of a collapsible rim which will enable inspection of the tire casing and tube during the expansion of the rim to determine that a correct seating thereof is effected.

The invention, therefore, further resides in the salient features of construction and the method hereinafter described and claimed, reference being made to the accompanying drawing wherein—

Figure 1 is a side elevation of the improved rim completely collapsed for being inserted within a tire.

Figure 2 is a similar view wherein the major rim sections have been manually expanded against the tire and the minor rim section set for receiving radial pressure to complete the rim expansion and, in effect, lock all the rim sections outwardly against the tire.

Figure 3 is an enlarged detail sectional view showing the minor or locking section and its connection with the main or major sections.

Figure 4 is a detail sectional view of the toe lock between the free end of the locking section and the other major section.

Similar reference characters designate corresponding parts throughout the several figures of the drawings.

The invention in one embodiment may be said to consist of a pair of hingedly connected rim sections each substantially of equal length and sustained in spaced relation at their free ends by an interposed and relatively short rim section which has a linked pivotal connection to one major rim section and is free of the companion section whereby the composite rim may not only be more easily expanded but also more compactly folded or collapsed.

Referring more in detail to the drawing, the numeral 1 designates the tire within which is arranged the improved rim embodying a pair of major sections 2 and a minor section 3. The major rim sections are joined together by a hinge 4 and each major section forms an arc of nearly 180° while the minor rim or locking section is less than half the arc of a major section. A link or double hinge, consisting of end hinge plates 5 and an interposed link 6, provides a play or loose connection between the free end of one major section and an end of the minor section, one hinge plate 5 being bolted or secured to the inner face of each of said sections with the hinge knuckles 7 fitting within cut-outs or openings 8, in the rim, to effect greater conformity of the hinge to the inner face of said rim. To the free end of the minor rim sections is attached or fixed a tongue plate 9 which is designed to engage in a cooperating socket plate 10 to interlock therewith and aid in alining the rim sections.

In expanding the rim to its normally operative position, the major rim sections are initially separated by hand, as far as possible, against the tire subsequent to which the hinge is folded backwardly upon itself to dispose the hinged end of the minor section into overlapping relation to the connected major section whereupon the tongue 9 may readily be inserted in socket 10, as is depicted in Figure 2. The final step in expanding the rim is effected simply by exerting outward pressure on the inwardly disposed, hinged end of the minor section, this being most readily accomplished by pressing outwardly with the foot. The link 6 and the minor section constitute a toggle joint which, when straightened, causes the major sections to be spread apart against the tension of the tires and when the toggle is moved outwardly beyond dead center the minor section springs into a tight fit between the spaced ends of the major sections. The three rim sections are thus securely locked against contraction by reason of the binding tension of the encircling tire. In mounting the rim on a wheel the laterally engaging, securing lugs, which are of usual form and number, will by design engage the three joints between the rim sections to hold the same more firmly.

The construction is simple, durable and practical, consisting of only three arcuate sections and therefore the usual one-piece rim can readily be reconstructed by first marking on the rim the points of contact of the securing lugs, applying the hinges and then sawing or cutting transversely through the rim to divide the same into the three sections.

This method insures the engagement of the securing lugs over the points of division.

By providing two major sections each of which comprises nearly one half of the rim, I am enabled to inspect the tire casing and inner tube until the rim has been well expanded and thereby to observe that all portions are definitely in place. Furthermore, with two equal major sections, the remaining complemental section is used more effectively and with less force and strain on the rim.

I claim:

1. A collapsible rim consisting of major sections hinged together and having square cut ends, a locking section also having square cut ends adapted to be wedged between said major sections to expand and hold them in normal position, a link having hinge leaves at opposite ends thereof respectively connecting with one of the major sections and the locking section, a keeper member carried by one of said major sections and providing a socket accessible in the direction of of the circumference of the rim, a tongue carried by the end of the locking section and adapted to slide into said socket when the hinge end of the locking section is placed under pressure to force the square ends thereof into abutting relation with the ends of the major sections.

2. A collapsible rim consisting of major portions hinged together and having square cut ends, a locking section also having square cut ends, a link connecting one end of the locking section and one end of the major sections, a keeper member carried by the other of said major sections and a tongue carried by the free end of the locking section and adapted to have a fulcruming engagement in the keeper member thereby to rock the locking section into line with the major sections upon the application of pressure to the hinge end of the said locking section.

In testimony whereof I hereunto affix my signature in the presence of two witnesses.

FREDERICK VOGEL.

Witnesses:
J. W. CRITES,
B. M. WITTENBERG.